3,664,697
LATCH MECHANISM

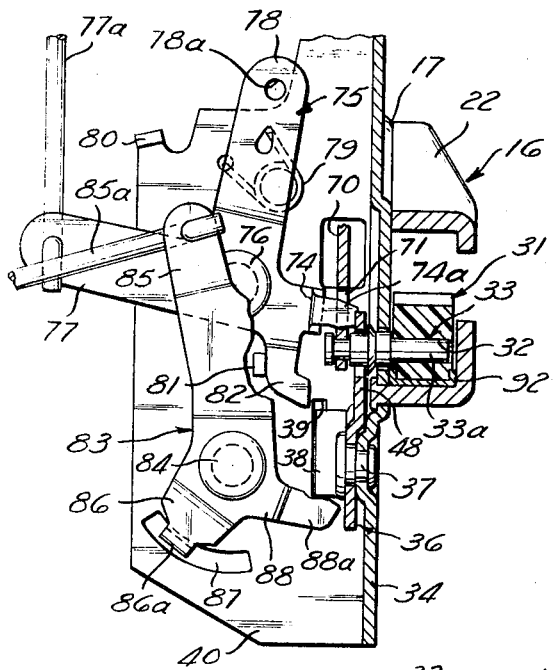
Fig. 5
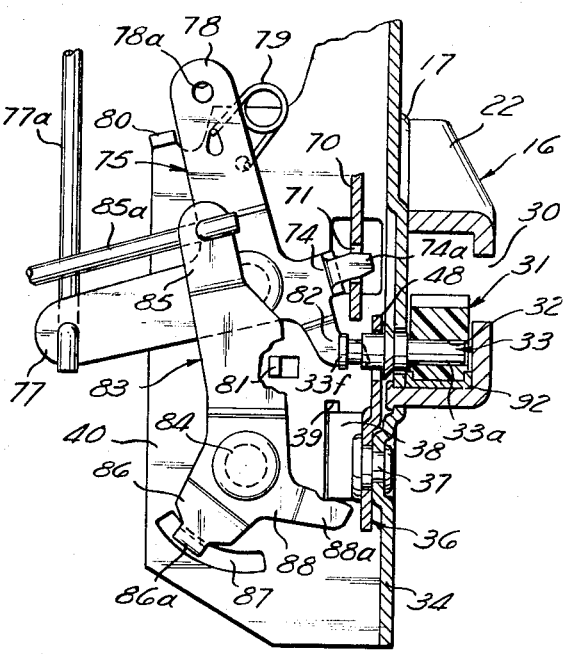
Fig. 6
Fig. 7
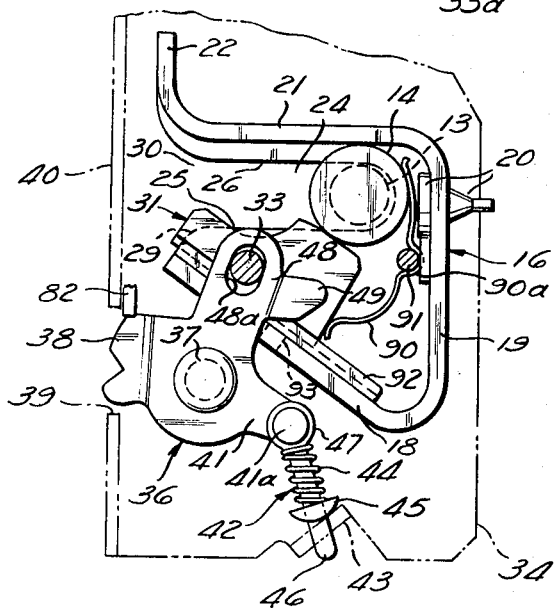
Fig. 9
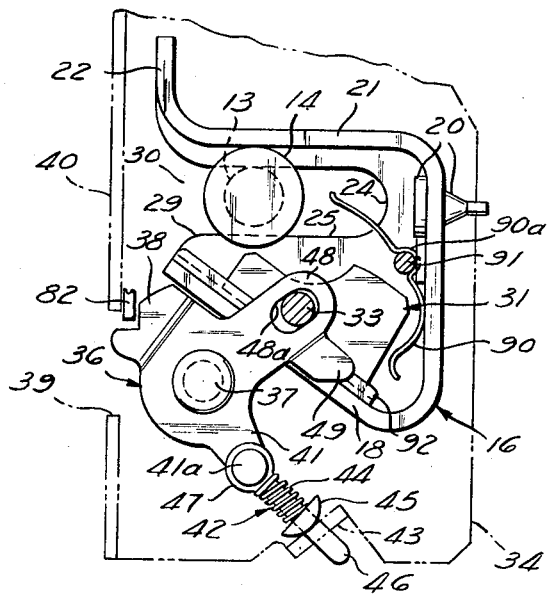
Fig. 8

United States Patent Office 3,664,697
Patented May 23, 1972

Angelo R. De Vito, 1354 S. Belvoir Blvd., South Euclid, Ohio 44121, and Otto V. Puzik, 5600 Clairidge Drive, Willoughby, Ohio 44094
Continuation-in-part of application Ser. No. 634,271, Apr. 27, 1967, now Patent No. 3,507,530. This application Apr. 13, 1970, Ser. No. 27,879
Int. Cl. E05b 65/22
U.S. Cl. 292—173                                      3 Claims

ABSTRACT OF THE DISCLOSURE

An automobile door latching mechanism characterized, among other things, by a slidable one-piece contactor that is movable between working and idling positions in one or both of which it is capable of pivotal deflection. Incorporated in the mechanism are levers, preferably levers of the bell-crank type, at least one of which can initiate movement of the contactor between working and idling positions. The mechanism includes connections extending from one of said levers to an externally housed latch element adapted to cooperate with an external striker.

BACKGROUND OF THE INVENTION

In their relation to accident-induced automobile door openings, automobile door latching systems have been the subject of study and recommendations by such groups as the Auto Crash Group at the University of California (Los Angeles). Findings of the latter have been reported, inter alia, in S.A.E. Transactions, vol. 67, 1959, 238–262; in S.A.E. Journal, S.P. 174; and in Paper No. 817A, entitled "Accidental Motorist Ejection and Door Latching Systems," presented by Arthur G. Gross of the Institute of Transportation and Engineering at the Automotive Engineering Congress held in Detroit, Michigan, January 13–17, 1964. The provision of improved door latching systems conforming to therein recommended standards constitutes the principal object of the present invention.

PRIOR ART

The prior art is exemplified by patents considered by the U.S. Patent Office in prior application Ser. No. 634,-271 (U.S. Pat. No. 3,507,530), of which the present application is in part a continuation; viz, U.S. Pats. Nos. 2,183,672 and 2,274,362 to W. C. Devereaux; No. 2,196,-477 to E. G. Simpson; No. 2,230,409 to S. B. McKenzie; Nos. 2,674,483 and 3,027,184 to A. R. DeVito; No. 3,171,677 to E. H. Klove et al., and British Patent No. 970,538 to Pickard.

BRIEF DESCRIPTION OF THE DRAWINGS

In the accompanying drawings, which show a preferred embodiment of the present invention.

FIG. 3a is an enlarged detail showing in perspective a portion of FIG. 3;

FIGS. 5 and 6 are fragmentary views corresponding generally to FIG. 4.

FIG. 7 is a side elevation of the pin extending from the latch element through the main latch plate and into the latch mechanism proper.

FIG. 8 and 9 are fragmentary views corresponding generally to FIG. 3 but showing more clearly the parts that are employed for the retention of the door in closed position.

PREFERRED EMBODIMENT OF THE INVENTION

Figure 1:
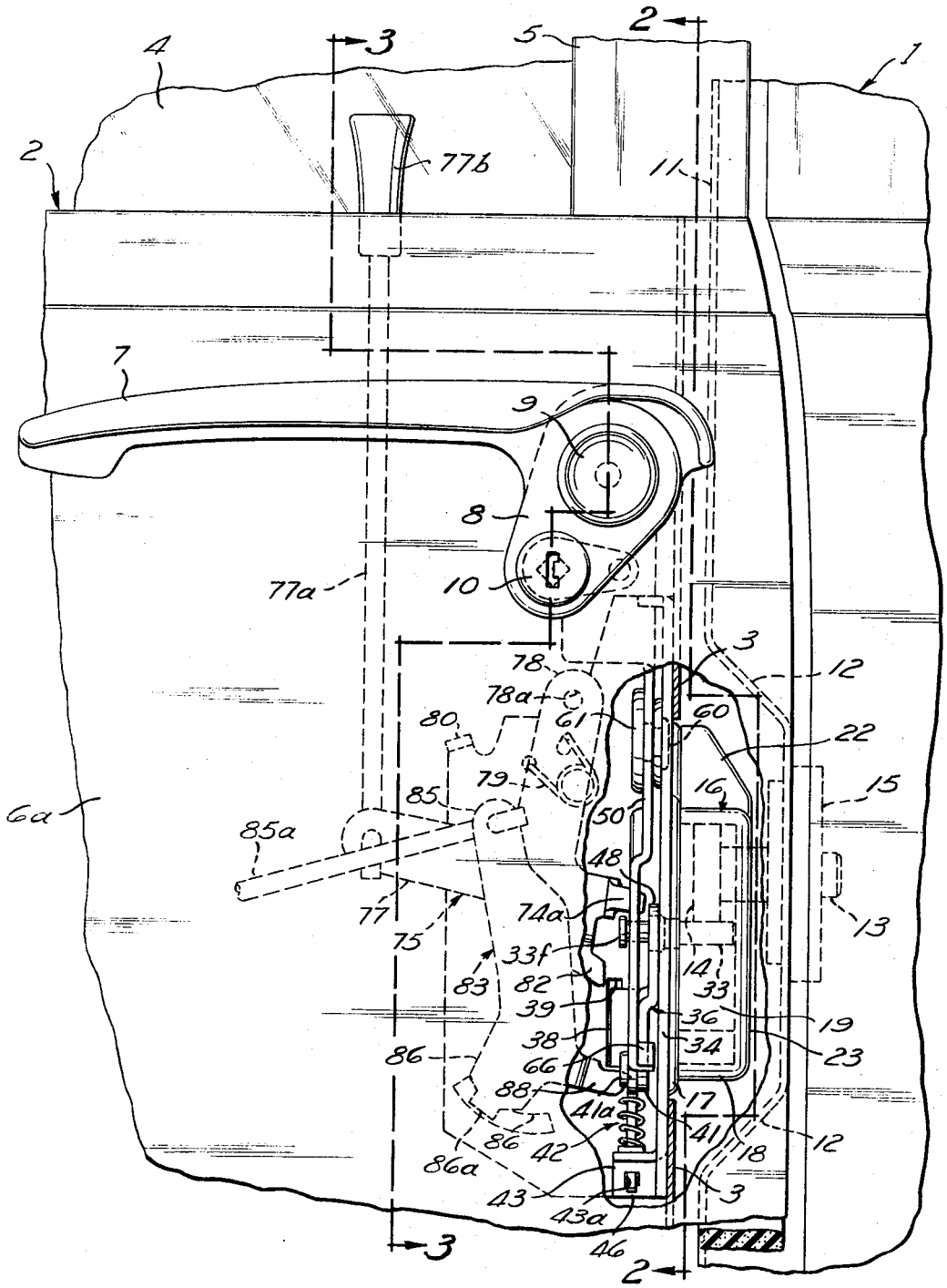
FIG. 1 is a fragmentary side elevation of the exterior of a closed, latched, unlocked left front door of an automobile wherein the latch mechanism of the present invention is incorporated.
Figure 2:
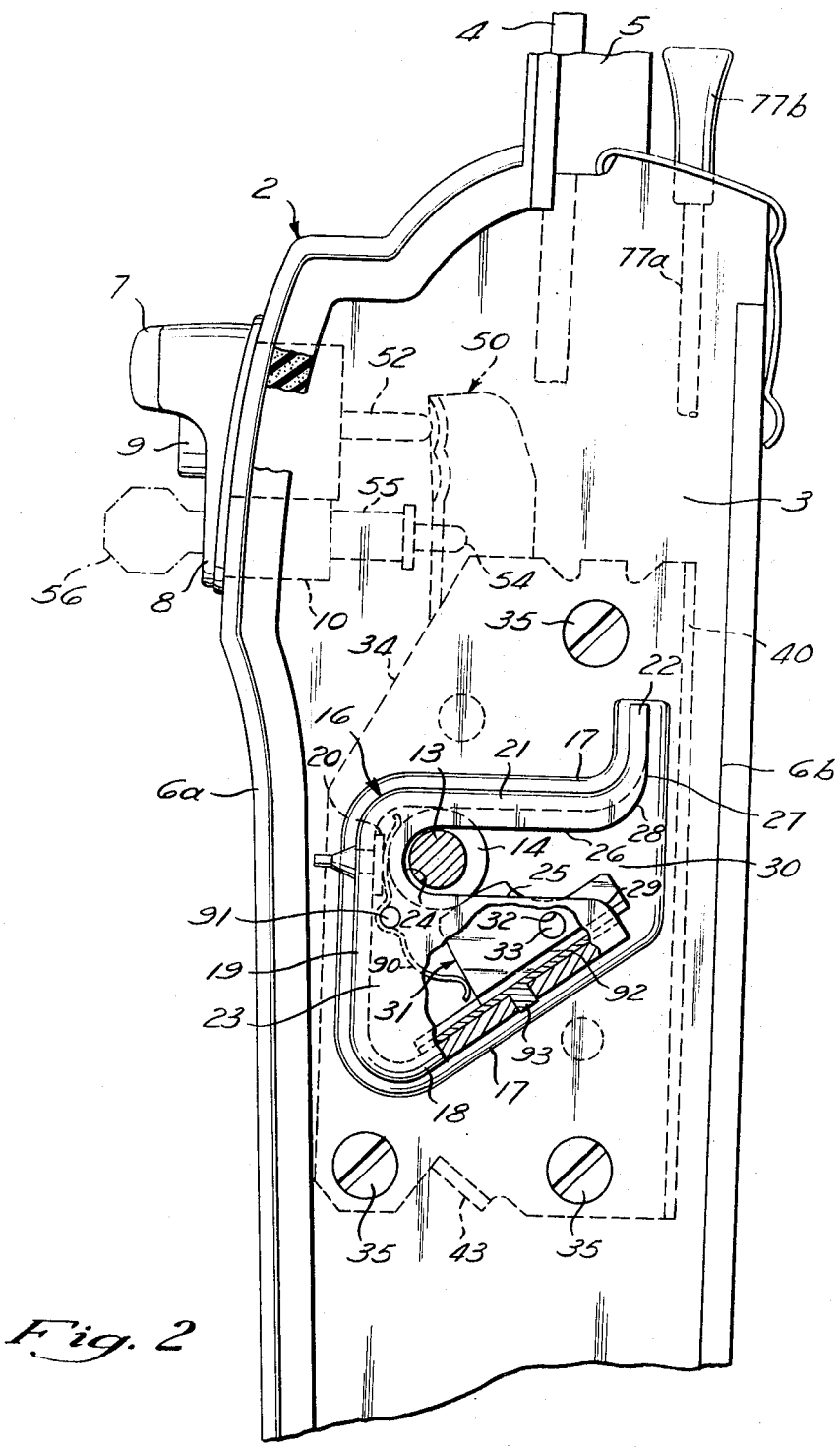
FIG. 2 is an end elevation with certain parts broken away, seen as if from line 2—2 of FIG. 1.
Figure 3:
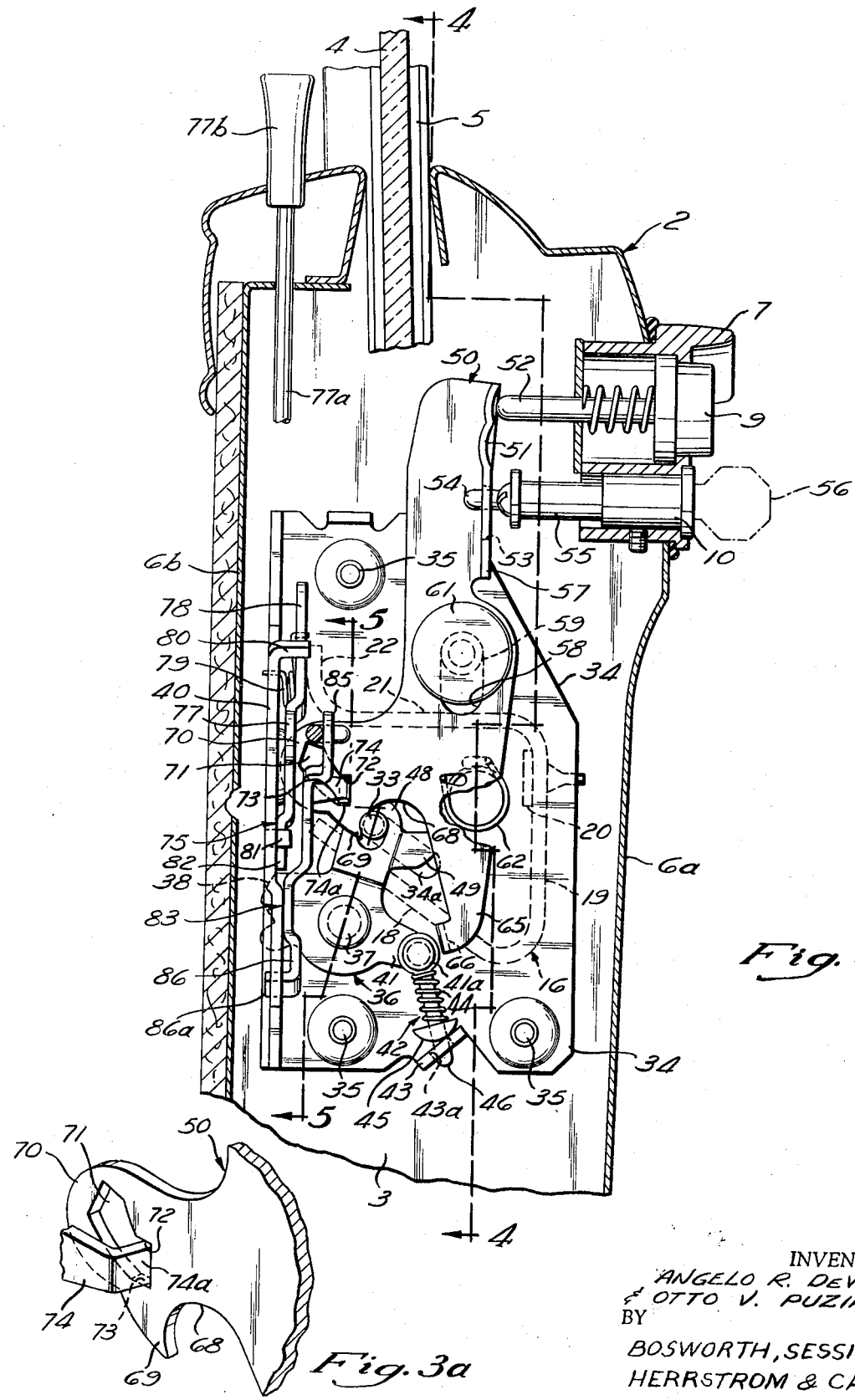
FIG. 3 is a vertical section, but with certain parts broken away, seen as if from line 3—3 of FIG. 1; i.e., looking toward the cleavage zone between the door and an adjacent body pillar.
Figure 4:
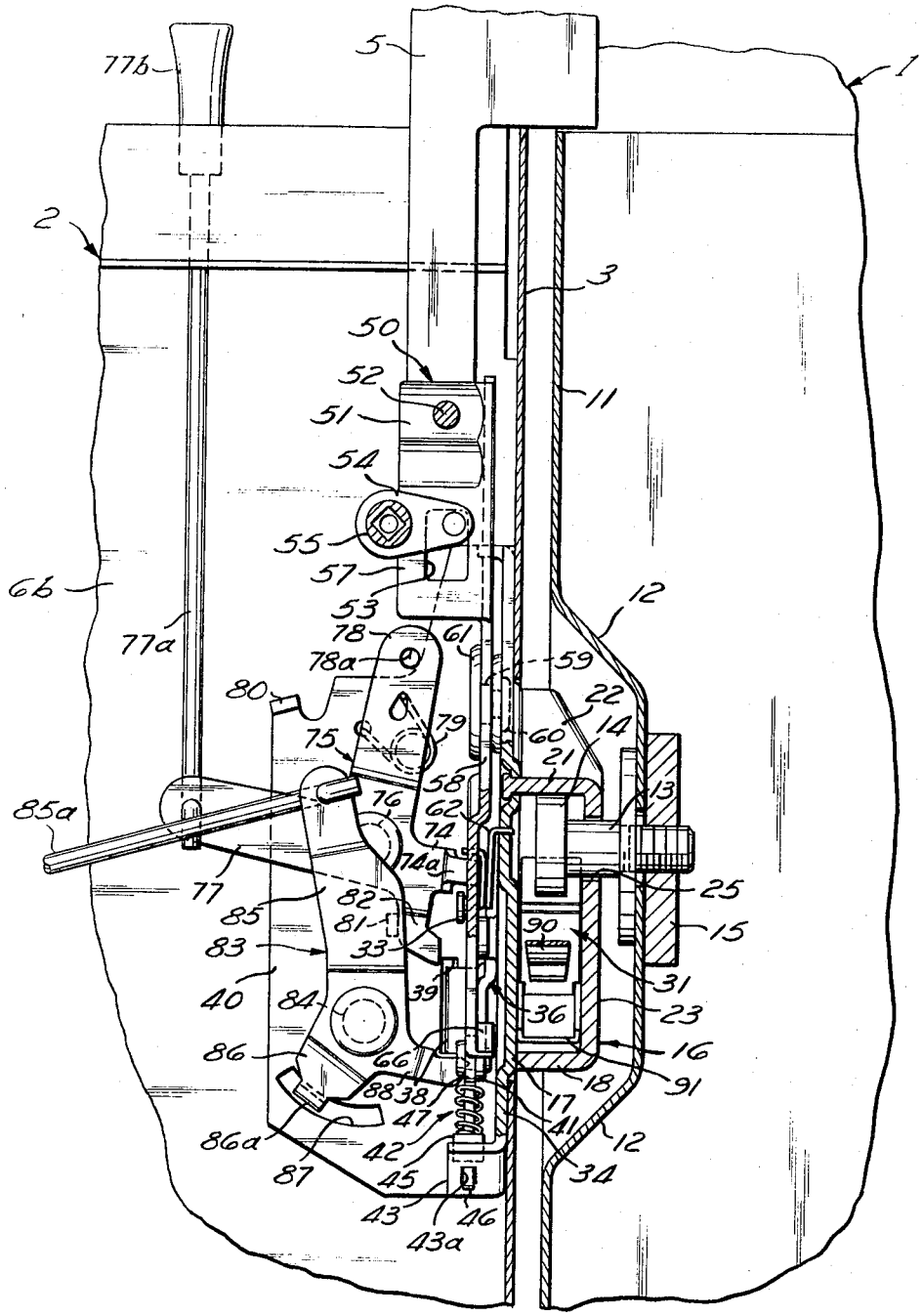
FIG. 4 is a vertical section seen as if from line 4—4 of FIG. 3 with both the door and the body pillar appearing in the figure but with window glass omitted.

In FIGS. 1 to 4, reference character 1 refers generally to the portion of an automobile body located immediately adjacent one of the door openings, which portion commonly includes a body pillar. Reference character 2 refers generally to the door itself, for convenience shown as the left front door of the automobile. The free end face of door 2, designated 3, is seen in FIGS. 2 and 4, the latter of which shows the cleavage zone between body portion 1 and end face 3. The usual window glass 4, operating in glass run channels 5, appears in each of FIGS. 1 to 3. In the case of door 2, the outside and inside panels are respectively indicated by reference characters 6a and 6b.

Mounted in conventional fashion on door 2 is a fixed door handle 7 with a downwardly reaching extension 8. Incorporated in extension 8 is a conventional push-button assembly 9 (FIGS. 1 and 2). The latter is of a type wherein the push button is biased by a coil spring (FIG. 3) toward an easily accessible outer position from which it can be urged inwardly by application of the thumb. Below the push-button assembly 9 is a cylinder lock 10, likewise conventional in location and construction.

In the cleavage zone between body portion 1 and door 2, metal door frame 11 on body portion 1 is recessed inwardly in the manner indicated in dotted lines in FIG. 1 and in solid lines in FIG. 4. Within recessed portion 12 is a stud 13 provided with a cylindrical head 14. Stud 13 and head 14 together constitute a striker the supported or inner end of which is firmly secured to a massive plate 15 that is rigidly affixed to the door frame forming part of body portion 1. Stud 13 and head 14 are adapted to coact with certain external latch components on end face 3, among them a latch housing affixed to the main latch plate and a slidable latch element within the latch housing. As is evident from FIG. 1, latch housing 16 projects beyond end face 3 into the cleavage zone between door 2 and door frame 11.

It will be apparent from a comparison of FIGS. 2 and 4 that in the preferred embodiment of the invention latch housing 16 is mounted on a raised portion 17 of the main latch plate. It is formed with a bottom wall 18, an end wall 19 supporting a resilient bumper 20, a top wall 21 with an upwardly directed tang-like extension 22, and a slotted side wall 23 connecting walls 18, 19 and 21. In side wall 23 is a laterally extending slot characterized by a semi-circular inner end 24, a lower edge 25, an upper edge 26, and an upwardly extending edge 27 correspondingly to upwardly directed tang-like extension 22 of top wall 21.

From FIG. 2 it will further be noted that the outer end of such laterally extending slot has a rounded corner 28 between upper edge 26 of the slot and the upwardly extending edge 27 on extension 22. A similar but oppositely facing corner 29 is provided at the outer end of underlying edge 25. Between corners 28 and 29 is a mouth 30 the greater portion of which is considerably wider than that portion of the slot which lies inwardly thereof; i.e., the portion to the left in FIG. 2. As door 2 approaches door frame 11, corners 28 and 29 embrace stud 13.

In consequence, housing 16 accepts stud 13 and head 14 in such manner as to align and guide door 2 into its closed position (FIG. 1). Head 14 contacts and thereafter remains in contact with the inside face of top wall 21, although ultimately stud 13 may itself come into contact with edge 26 on latch housing 16. Thus the striker consisting of stud 13 and head 14 carries the weight of the door without the need for providing and relying on upper and lower dovetail elements such as are commonly present in the door frames of many conventional automobiles.

By virtue of this feature of the invention, latch element 31, wedging under striker head 14 as in FIGS. 2 and 9, prevents rattling of the door.

Contained and confined within latch housing 16 is the spring-loaded latch element 31, generally polygonal in shape, of which the bottom face is inclined in parallelism with inclined bottom wall 18 of the latch housing. Latch element 31 will be discussed in greater detail hereinafter. For the present, it will be sufficient to note that, although it may be made of metal, it preferably consists of a tough, hard, durable, wear-resistant synthetic resin. Suitable synthetic resins are readily available on the commercial market.

As indicated in FIG. 2, latch element 31 is provided with a transverse bore 32 of a diameter small enough to permit it to receive with a snug fit the reduced outer portion 33a of the headed pin 33 seen in FIGS. 5 to 7. In and to the left of the zone in which it passes through main latch plate 34; i.e., inwardly of reduced portion 33a, pin 33 is formed with an integral two-stage enlargement 33b, 33c the stages of which are separated by a frusto-conical flange 33d. Inwardly of enlargement 33b, 33c is a circular groove 33e; inwardly thereof, at the extreme inner end of pin 33, is head 33f. Except for outer portion 33a, most of these portions of pin 33 project inwardly into proximity to and at times into engagement with other parts of the latch mechanism through an inclined elongated slot 34a in main latch plate 34 (FIG. 3). Latch plate 34, which is attached to end face 3 by the screws 35 seen in FIG. 2, supports the latch mechanism proper.

Along with certain other components, a release lever 36 of the bell crank type is mounted, as by means of pivot pin 37, on the inside face of latch plate 34. It is equipped with a laterally extending lever arm 38 that extends into slot 39 in latch flange 40 (FIG. 9) for reasons explained below. Its pivotal movement is limited by the fact that upwardly extending arm 48 is provided with an elliptical slot 48a that embraces enlarged portion 33c of pin 33 where the latter projects through the inclined elongated slot 34a in latch plate 34 (FIG. 3).

It will be noted that on release lever 36 there is a second laterally extending arm 41 equipped with a headed stud 41a on which is pivoted the in-board end of a spring assembly 42. At its outboard end, spring assembly 42 is loosely coupled to an anchoring tab 43 on latch plate 34: see FIGS. 8 and 9. Apart from compression spring 44, spring assembly 42 consists of a loose spring seat 45 of a suitable synthetic resin, a metal pin 46 that projects through a slot 43a in tab 43 (FIGS. 3 and 4), and an integrally formed eye 47 that is free to swivel on the shank of stud 41a (FIGS. 8 and 9). Spring assembly 42 biases release lever 36 in a clockwise direction when the mechanism is unlatched (viz., under the conditions represented in FIG. 8) and in a counterclockwise direction when the mechanism is latched (viz., under the conditions represented in FIG. 9).

On the generally upwardly extending arm 48 of release lever 36, on the right in FIG. 3, is a laterally extending nose 49 adapted, on clockwise movement of release lever 36, to engage contactor 50. As explained in co-pending application Ser. No. 634,271, contactor 50 has two distinct types of movement one of which is a pivotal movement in which its extremities describe arcuate paths and the other of which is a rectilinear sliding movement taking it from one to the other of an upper or idling position and a lower or working position. It is only when it is in its upper or idling position that the latch mechanism is locked.

Pivotal movement of contactor 50 may be brought about in several ways, one of which makes use of a horizontally ridged two-section flange 51 located at the upper end of the contactor. See FIGS. 3 and 4. With the parts in the position shown in FIG. 3 (i.e., with door 2 closed but not locked) plunger 52, which forms part of push-button assembly 9, can be urged against the upper section of flange 51 by applying the thumb to the push button. Counterclockwise movement of contactor 50 resulting therefrom brings it into an angled position (not shown) that can be maintained as long as pressure is exerted on flange 51 by plunger 52.

Through the intervention of release lever 36 and certain elements yet to be described, this movement of the upper end of contactor 50 causes latch element 31 to retreat from its latched position, thereby releasing striker head 14 and unlatching the mechanism as a whole. However, when contactor 50 is at the extreme upper limit of its sliding movement, any such counterclockwise movement initiated by plunger 52 will be without significant effect on other parts of the latch mechanism. The contactor is merely deflected temporarily into its angled position. This "freewheeling" type of movement is a desirable rather than a necessary feature of the invention.

Contactor 50 may be urged in more than one way between its upper and its lower positions. The simplest is by initiating upward sliding movement by the application of pressure beneath the overlying edge of a slot 53 in the lower portion of flange 51, as by a crank 54 attached to an extension 55 forming part of cylinder lock 10. Assuming that key 56 is turned counterclockwise, extension 55 will rotate through an arc of roughly 90° in a manner such as to cause crank 54 to bear against the upper edge of slot 53, thus forcing contactor 50 upward out of its lower or working position.

With contactor 50 in its upper position, the door is locked. The contactor can be returned to its lower position, thereby unlocking the door, by turning key 56 clockwise. This movement of key 56 in cylinder lock 10 causes crank 54 to engage the underlying edge of slot 53. Although both FIGS. 3 and 4 show contactor 50 in its lower position, a comparison of the two will make clear what happens when crank 54 is actuated, clockwise or counterclockwise, so as to bring about there movements.

Movement of contactor 50 between upper and lower positions is made possible by the inclusion, somewhat below lower portion 57 of flange 51, of a vertical slot 58 and the employment therein of a stepped rivet 59 (FIG. 4). Rivet 59 is retained in place between and by means of a portion 60 headed over against latch plate 34 and a broad head 61 loosely engaging contactor 50. This arrangement makes possible the above-described pivotal deflection of contactor 50, regardless of whether the contactor is in its upper or lower position. Toggle spring 62, seen in FIGS. 3 and 4, is provided to restrain contactor 50 when in its upper and lower positions and return it to its undeflected positions.

Contactor 50 has a depending extension 65, seen in FIG. 3, at the end of which is an integral tab 66 that extends at right angles to the plane of the contactor as a whole. To the left of extension 65 is a rounded cut-away portion 68 terminating in a tang 69. Under certain conditions, nose 49 on upper arm 48 of release lever 36 will come into engagement with tab 66, particularly in the event that release lever 36 is moved in a clockwise direction at a time when contactor 50 is in its upper or idling position. After initial contact has been established, further clockwise movement of arm 48 of release lever 36 has the effect of urging contactor 50 downward into its lower or working position.

If, when contactor 50 is in its lower or working position, deflection of the upper end is induced by thumb pressure on push button 9, tank 69 on contactor 50 engages pin 33 at groove 33e, thereby rotating release lever 36. This results in movement of spring assembly 42 and latch element 31 out of the positions which they occupy in FIGS. 2 and 3 into the new positions illustrated in FIG. 8. Simultaneously, latch element 31 releases striker head 14, thus permitting removal of the thumb from push button 9 preparatory to opening door 20.

In the preferred embodiment of the invention, contactor 50 is also provided, at about the level of toggle spring 62, with an integral lateral extension 70 in which is formed an inclined arcuate slot 71 characterized by squared-off upper and lower ends. Projecting into slot 71 is the tab-like end 74a of a laterally extending lever arm 74, one of the three arms of a locking lever 75 pivotally mounted at 76 on latch flange 40. See FIGS. 3, 3a and 4.

Locking lever 75 provides additional means; viz, lever arms 77 and 78, for moving contactor 50 between its upper and lower positions. When the latch mechanism is installed in a front door, the locking lever may be actuated by a garnish molding button 77b attached to a rod 77a coupled to laterally extending lever arm 77 (FIG. 4). If the latch mechanism is to be used in a rear door, hole 78a in lever arm 78 may be used for attaching a horizontally extending rod connected through a bell-crank lever to a rod similar to rod 77a. A comparison of FIGS. 5 and 6 will reveal that locking lever 75 is normally biased by a toggle spring 79 toward one or the other of two extreme positions. It is precluded from moving too far in either direction by latch flange tabs 80 and 81.

If extension 70 on contactor 50 is in its lower position, as in FIG. 5, and lever arm 77 is pushed downward by rod 77a, tab 74a on arm 74 engages upper flat 72 on slot 71 as shown in FIG. 3a, thus pushing contactor 50 upward. Alternatively, if extension 70 is in its upper position, as in FIG. 6, and lever arm 78 is moved from left to right, tab 74a on arm 74 engages lower flat 73 on slot 71, thus pushing contactor 50 into its lower position. In either case, whether initiated by arm 77 or arm 78, the movement so imposed on locking lever 75 has no direct effect on latch element 31.

A remote control lever 83, which, like locking lever 75, is of the bell-crank type, is movably mounted on latch flange 40 below locking lever 75 (FIG. 4). It is held to the latch flange by a pivot pin 84. To its upwardly directed lever arm 85 may be coupled a rod 85a extending laterally to a remotely located operating handle (not shown). On downwardly directed lever arm 86 is a tab 86a that extends at right angles to the plane of arm 86 itself. Tab 86a projects into an arcuate slot 87 in latch flange 40. The ends of slot 87 serve as stops for tab 86a and thus for lever 83. There is also a third, laterally extending lever arm 88 (FIGS. 5 and 6) with an off-set end portion 88a underlying arm 38 of release lever 36. By virtue of this arrangement, lever 83 can be made to engage and lift arm 38 of release lever 36.

When contactor 50 is in its upper or idling position and release lever 36 is rotated clockwise by upward movement of arm 88 of remote control lever 83, nose 49 on arm 48 of release lever 36 engages tab 66 of contactor 50. Further movement of remote control lever 83 forces contactor 50 downward, after which door 2 will be free to swing open. With the door open, spring 44 maintains release lever 36, pin 33 and latch element 31 in the positions shown in FIG. 8. Upon closing of the door, due mainly to the presence of striker head 14 and leaf spring 90, the displaced parts return automatically to their original positions, thus keeping the door shut.

One of several significant advantages characterizing the invention resides in the fact that it provides what is commonly known in the art as the self-cancelling feature. The allusion is to the undogging of contactor 50; i.e., its automatic return, largely by virtue of the action of tab 66, from its latched upper position to its unlatched lower position, more especially in the event locking lever 75 is pushed into locked position while door 2 is open. The self-cancelling feature prevents the driver from locking himself outside the vehicle through inadvertence.

The action within latch housing 16 is substantially the same as that described in copending application Ser. No. 634,271 except that latch element 31 is helped toward chocking position by spring 90. The latter is held in place by a transversely extending rivit 91 (FIG. 8) in an offset 90a at the middle portion of the spring. When the striker enters housing 16, striker head 14 contacts the upper arm of spring 90, which rotates clockwise around rivet 91. Its lower arm operates on and initiates the upward movement of latch element 31 prior to the time the toggle action of coil spring 44 comes into operation as indicated in FIG. 9. Although spring 90 supplements the action of coil spring 44, its main purpose is to initiate upward movement of latch element 31.

An additional feature tending to make for enhanced reliability of operation of the parts in latch housing 16 is to be found in the employment of anti-friction means between latch element 31 and bottom wall 18 of latch housing 16. Preferably of the nature of a shoe 92 of nylon or the like, such antifriction means are held in place by an integral boss 93 that projects downwardly into a correspondingly shaped opening in bottom wall 18. See FIG. 2. In lieu of shoe 92, it is entirely possible to use anti-friction rollers, confining them in suitable fashion to the area occupied by shoe 92.

One of the practical advantages of the invention resides in the fact that door 2 may be closed, latched and locked without the need for using a key unless the operator prefers to use one. Assuming the door to be open, keyless locking from outside the vehicle can be accomplished in two steps; namely, by pushing down garnish molding button 77b into locking position, meanwhile pressing button 9 in push button assembly 7 inward as far as it will go. Button 9 may be released when the door is flush with the body, by which time chocking and full automatic locking will have taken place.

Another practical feature of the invention resides in the fact that locking lever 75 can be moved into locked position only if door 2 is fully open or fully closed. If door 2 is incompletely closed, garnish molding button 77b cannot go into locked position. Under such conditions, it moves back automatically into non-locking position. If door 2 is fully closed, as in FIGS. 1, 2, 3 and 4, locking lever 75 can be rotated counterclockwise by pushing down on garnish molding button 77b.

Under these conditions, depending finger 82 of locking lever 75 is free to pass the top edge of lever arm 38 of release lever 36, thus permitting tab 74a (FIG. 3a) on locking lever 75 to raise contactor 50 to its upper or idling position. If, however, door 2 is not fully closed, release lever 36 will be turned a few degrees clockwise with lever arm 38 blocking depending finger 82 (FIG. 9). Thus the operator is warned that the door is not fully shut.

Mention has been made of the fact that when the automobile door is closed, striker head 14 is in contact with the lower face of upper wall 21 of latch housing 16. Therefore, dovetail elements such as are commonly used in automobile door latch mechanisms are not necessary. The door aligns itself in proper position for closing as slot 24 in side wall 23 of the latch houing approaches striker stud 13, initially in the vicinity of mouth 30 (FIG. 8). Thereafter, the entire weight of door 2 is carried by striker stud 13 and head 14, with no possibility of misalignment of door 2 in relation to the frame of the door opening.

It is evident that changes may be made without departing from the spirit of the invention, as by adding features known to the prior art; for example, the usual child-safety lever. Simplification is sometimes feasible, as, for example, where the construction of the door and the manner of its use do not require an operating rod on the locking lever. In many cases, shapes and proportions may be varied, as, for example, the shapes and proportions of the bell-crank levers on the latch plate and latch flange.

It is intended that the patent shall cover, by summarization in the appended claims, all features of patentable novelty residing in the invention.

What is claimed is:

1. In a vehicle body, a door hinged to the body; a frame therefor; a striker rigidly mounted on the inside edge of the frame, said striker taking the form of a massive stud provided at its distal end with a flat transversely-extending headed portion; a latch mechanism incoporating a resiliently biased internal release lever, said latch mechanism being attached to the door inside the striking edge of the door; a latch housing projecting outwardly from the latch mechanism through an opening in the striking edge of the door into the cleavage zone between the door and the door frame, said latch housing having in its outer wall an open-ended slot of opposed, substantially horizontally disposed parallel edges between which to closely receive said striker stud, said headed portion overlapping the sides of the parallel edges; a generally wedge-shaped latch element carried within the latch housing for movement parallel to said outer wall along a path disposed at an angle from the vertical and toward and away from a position adjacent said slot near its open end; means connecting the release lever and the latch element for moving said latch element along said angular path to effect, or release, chocking engagement with said striker stud, the striker stud and wedge-shaped latch element being so related that when they are in such chocking engagement the bias on the internal release lever is transferred through the wedge-shaped latch to the striker stud to continually bias it inwardly of the slot, whereby said latch mechanism may be used repeatedly without rattling resulting from wear.

2. A latch mechanism according to claim 1 wherein the latch element consists of a stepped wedge that is susceptible of being guided by the bottom wall of the housing.

3. A latch mechanism according to claim 2 wherein the stepped portion of the latch element has a first surface producing early latching on initial engagement with the striker and a second surface making chocking contact with the striker.

References Cited

UNITED STATES PATENTS

| | | | |
|---|---|---|---|
| 2,145,982 | 2/1939 | Henning | 292—173 X |
| 2,230,409 | 2/1941 | McKenzie | 292—302 |
| 2,183,672 | 12/1939 | Devereaux | 292—302 X |
| 2,236,702 | 4/1941 | Andersen | 292—302 X |
| 3,093,992 | 6/1963 | France | 292—216 X |
| 3,206,240 | 9/1965 | Roethel | 292—216 |

FOREIGN PATENTS

| | | | |
|---|---|---|---|
| 80,825 | 5/1963 | France | 292—198 |

ALBERT G. CRAIG, Jr., Primary Examiner

U.S. Cl. X.R.

292—302, DIG. 26